US005495236A

United States Patent [19]

Minami

[11] Patent Number: 5,495,236
[45] Date of Patent: Feb. 27, 1996

[54] PAGING RECEIVER WITH A DISPLAY AND A PROGRAMMABLE ALTERING DEVICE

[75] Inventor: Yoichiro Minami, Tokyo, Japan

[73] Assignee: NEC Corporation, Tokyo, Japan

[21] Appl. No.: 298,183

[22] Filed: Aug. 30, 1994

Related U.S. Application Data

[63] Continuation of Ser. No. 963,254, Oct. 19, 1992, abandoned, which is a continuation of Ser. No. 709,945, Jun. 4, 1991, abandoned.

[30] Foreign Application Priority Data

Jun. 4, 1990 [JP] Japan ................................ 2-58463 U

[51] Int. Cl.[6] ........................................ H04B 7/00
[52] U.S. Cl. ................................ 340/825.44; 340/825.48; 340/825.22; 455/38.5
[58] Field of Search ......................... 340/825.44, 825.45, 340/825.47, 825.48, 825.22; 455/38.5

[56] References Cited

U.S. PATENT DOCUMENTS 4,422,071 12/1983 de Graaf ............................ 340/825.44
4,868,561 9/1989 Davis ................................ 340/825.44
4,943,803 7/1990 Vrijkorte ............................ 340/311.1
4,962,545 10/1990 Klaczak et al. .................... 340/825.44
4,975,693 12/1990 Davis et al. ....................... 340/825.45

FOREIGN PATENT DOCUMENTS 9104614 4/1991 WIPO .............................. 340/825.48

*Primary Examiner*—Michael Horabik
*Attorney, Agent, or Firm*—Sughrue, Mion, Zinn, Macpeak & Seas

[57] ABSTRACT

A paging receiver having a display and an alerting device which alerts the user to an incoming call by producing tones in any one of a plurality of different patterns. The paging receiver allows the user to replace any of the patterns with a desired pattern by operating a setting device. The desired pattern is written to an EEPROM (Electrically Erasable Programmable Read Only Memory) built in the paging receiver.

6 Claims, 5 Drawing Sheets

PAGING RECEIVER WITH A DISPLAY AND A PROGRAMMABLE ALTERING DEVICE

This is a continuation of application Ser. No. 07/963,254 filed Oct. 19, 1992, now abandoned, which is a continuation of Ser. No. 07/709,945 filed Jun. 4, 1991, now abandoned.

BACKGROUND OF THE INVENTION

The present invention relates to a paging receiver having a display and, more particularly, to a paging receiver having a display and improved alerting means which allows the user of the receiver to set any desired alert tone pattern therein.

Alerting means incorporated in the above-described type of paging receiver for alerting the user to an incoming call is available in some different types, i.e., a type causing a vibrator to vibrate, a type causing an indicator implemented by an LED (Light Emitting Diode) to flash, a type causing a speaker to sound, and a type which is the combination of any of such types. The sound type alerting means may even be constructed to selectively produce either one of a loud tone and a low tone, either one of a high-pitched tone and a low-pitched tone, or any one of a plurality of different tone patterns, as proposed in the art. Such a construction allows the user to identify, for example, the person who is calling or the level degree of importance of the call. Regarding the plurality of tone patterns, each of them has a particular number of intermittent tones and a particular tone length per predetermined time. It has been customary for a manufacturer to write a predetermined set of tone patterns in all of the paging receivers at the production stage. This brings about a problem when some persons carrying paging receivers produced by the same manufacturer use the receivers at the same location. Namely, the user of a given paging receiver cannot readily see whether the receiver being called in the user's receiver or whether it is another person's receiver, since all the receivers share identical tone patterns. This forces the user of the paging receiver to look at the display for confirmation every time the receiver is called.

SUMMARY OF THE INVENTION

It is therefore an object of the present invention to provide a paging receiver having a display and allowing the user of the receiver to set any desired tone pattern to be produced by alerting means.

It is another object of the present invention to provide a paging receiver having a display and facilitating the distinction thereof from the others of the same type in respect of the reception of a call.

It is another object of the present invention to provide a generally improved paging receiver with a display.

In accordance with the present invention, a paging receiver having an alerting device which alerts, if a paging signal received is coincident with a paging signal assigned to the receiver, the user of the receiver to a call by producing tones in any one of a plurality of tone patterns comprises a tone pattern setting device for replacing any of the tone patterns with a desired tone pattern, a storage for storing the desired tone pattern set by the tone pattern setting device, and a controller for causing the alerting device to produce the desired tone pattern by reading it out of the storage.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
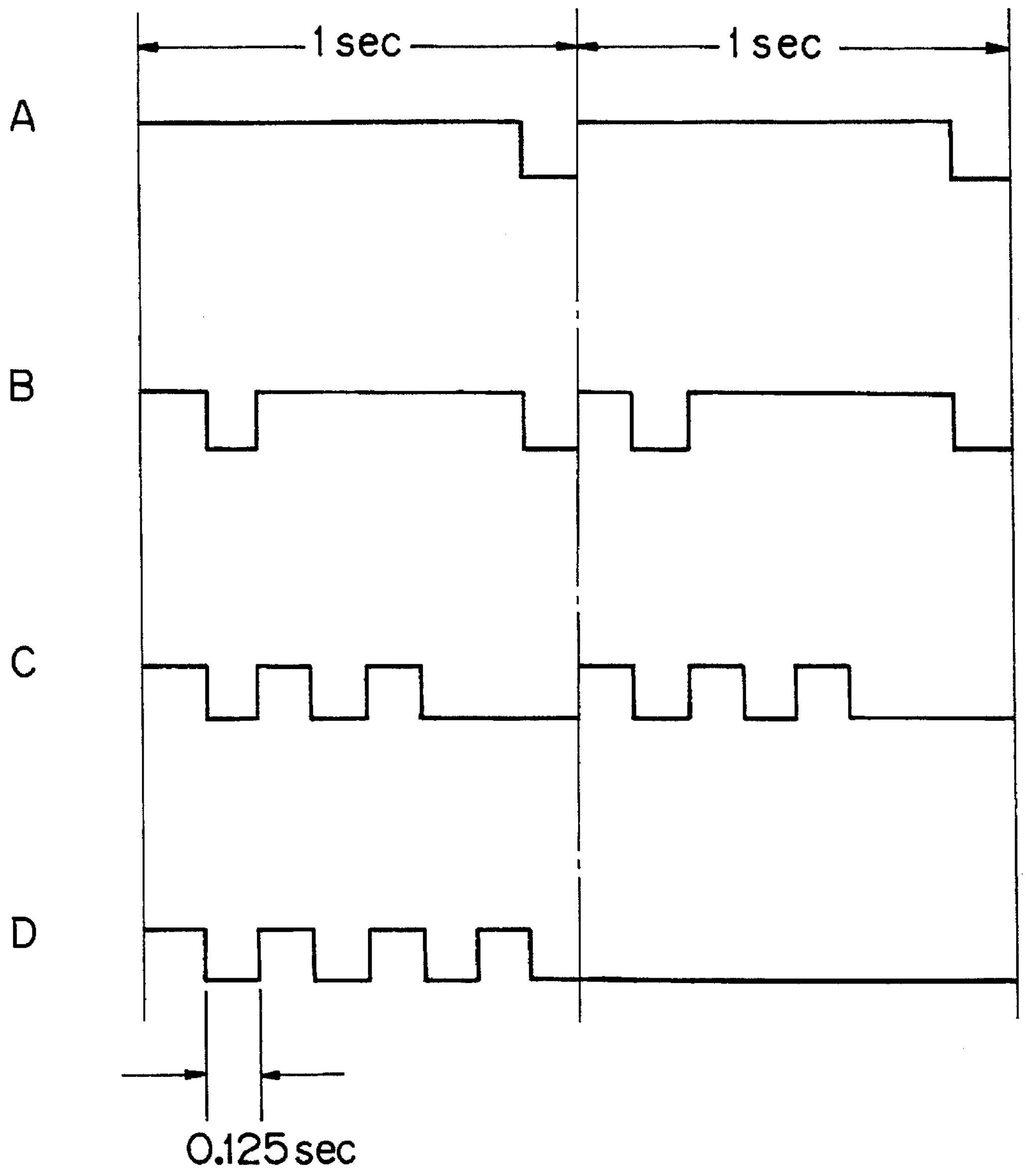
FIG. 1 shows specific patterns in which alerting means may produce alert tones.

FIG. 1 shows specific patterns A, B, C and D in which alerting means incorporated in a paging receiver with a display may produce alert tones for the distinction of calling persons or the degrees of importance of a call. The patterns A–D are referred to as an A call, B call, C call, and D call, respectively. As shown, the patterns A–D each has a particular number of tones and a particular tone duration per predetermined time (tone period). In these specific patterns, the tone period is 2 seconds while the shortest interval between successive tones is 0.125 second.

Figure 2:
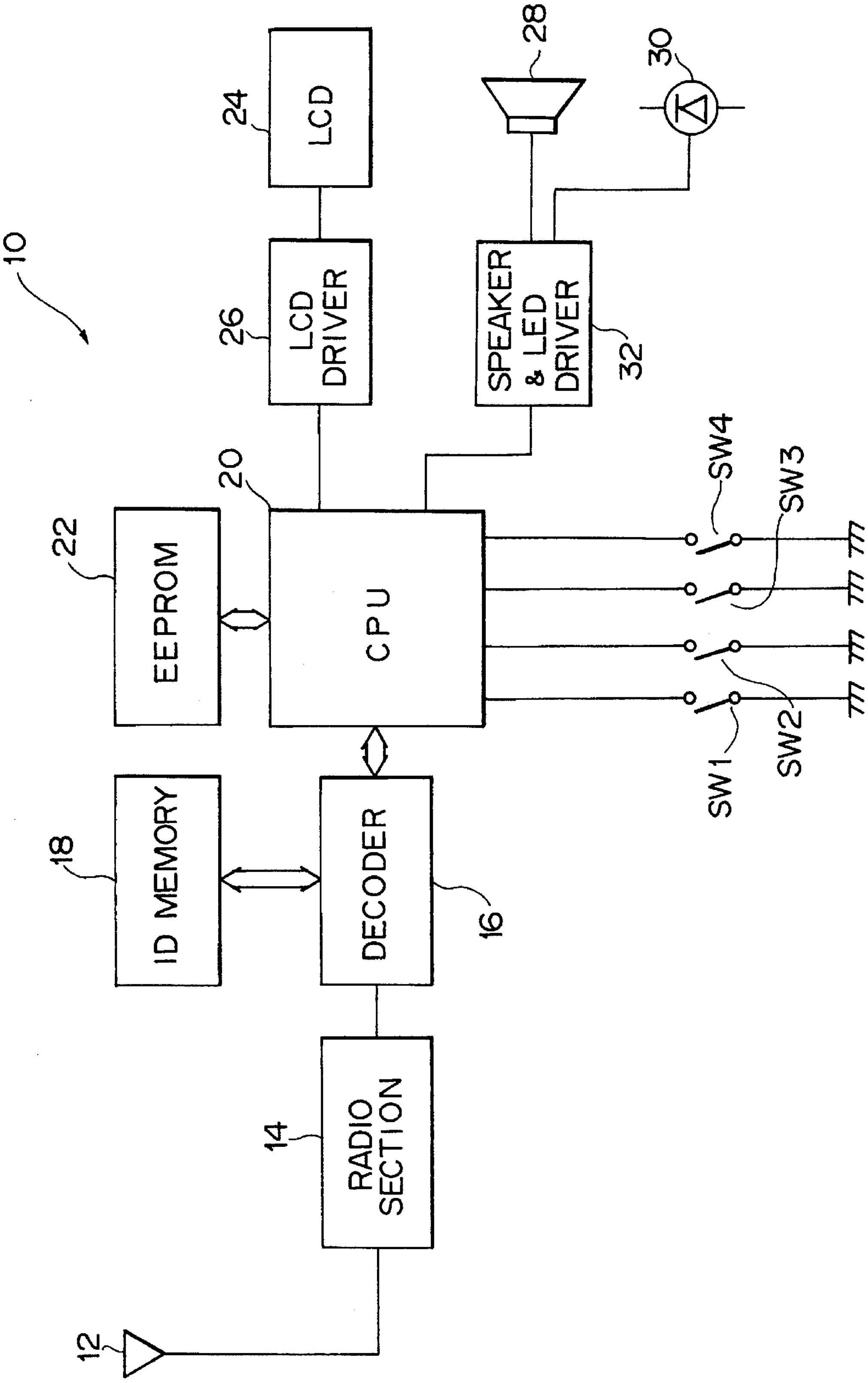
FIG. 2 is a block diagram schematically showing an embodiment of a paging receiver with a display in accordance with the present invention.

Referring to FIG. 2, a paging receiver with a display embodying the present invention is shown. As shown, the paging receiver, generally 10, has an antenna 12, a radio section 14, a decoder 16, an ID (Identification) memory 18, a CPU 20, an EEPROM (Electrically Erasable Programmable Read Only Memory) 22, an LCD (Liquid Crystal Display) 24, an LCD driver 26, a speaker 28, an LED (Light Emitting Diode) 30, a speaker and LED driver 32, and switches SW1–SW4.

In operation, a radio signal coming in through the antenna 12 is amplified, demodulated and waveform-shaped by the radio section 14 to become a bilevel digital signal. The resulted digital signal is applied to the decoder 16. The decoder 16 compares a paging number assigned to the receiver and stored in the ID memory 18 with the digital signal. If the stored paging number and the digital signal are coincident, the decoder 16 feeds a detection signal to the CPU 20. In response to the detection signal, the CPU 20 delivers a sound signal to the speaker and LED driver 32 with the result that the speaker 28 produces an alert tone and the LED 30 flashes. When a message is received, the CPU 20 delivers a display signal to the LCD driver 26 to thereby display the message on the LCD 26. Some different tone patterns are stored in the EEPROM 22 at the time of shipment. The CPU 20 is capable of reading such tone patterns out of the EEPROM 22. Specifically, on receiving the detection signal from the decoder 16, the CPU 20 reads a particular tone pattern out of the EEPROM 22 and then feeds a sound signal corresponding to the tone pattern to the speaker and LED driver 32. As a result, alert tones corresponding to the tone pattern are successively produced via the speaker 28.

The illustrative embodiment allows the user of the paging receiver 10 to replace the tone patterns stored in the EEPROM 22 at the time of shipment with any desired tone patterns. Specifically, the user may write any desired tone pattern in the EEPROM 22 by operating the four switches SW1–SW4 which are connected to the input ports of the CPU 20.

A reference will be made to FIGS. 3–5 for describing a specific procedure in which the user of the paging receiver 10 writes a desired tone pattern in the EEPROM 22.

To set up a tone pattern set mode, the user turns on the power source of the paging receiver 10 while pressing the switch SW1 (step S1). While any one of the switches SW1–SW4 may be pressed, the gist is that the turn-on of the power source and that of one of the switches SW1–SW4 be performed at the same time to avoid erroneous operations. On entering the tone pattern set mode operation, the CPU 20 clears a counter N (S2) and jumps to a frequency set subroutine (S3).

Figure 4:
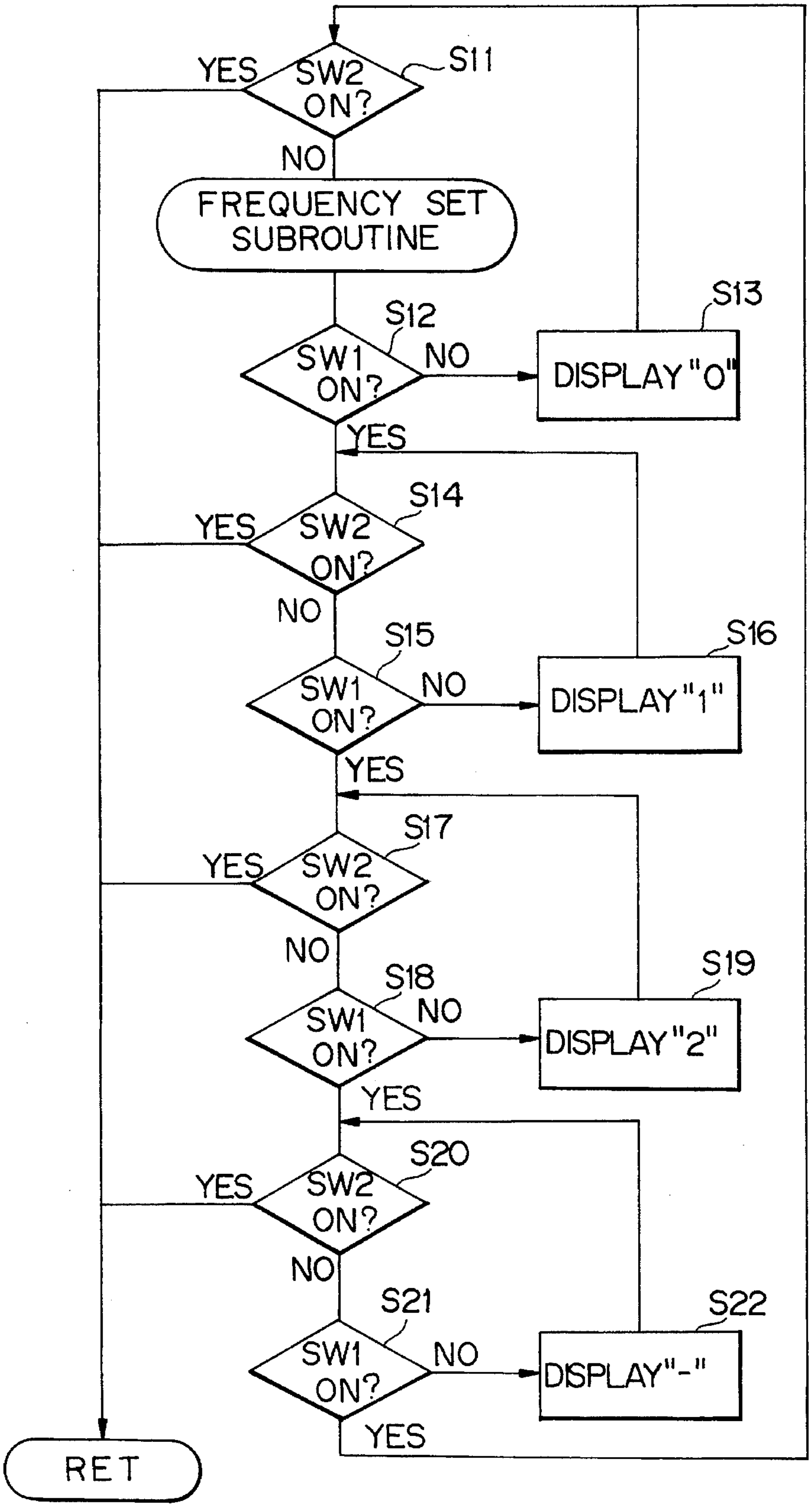
Figure 5:
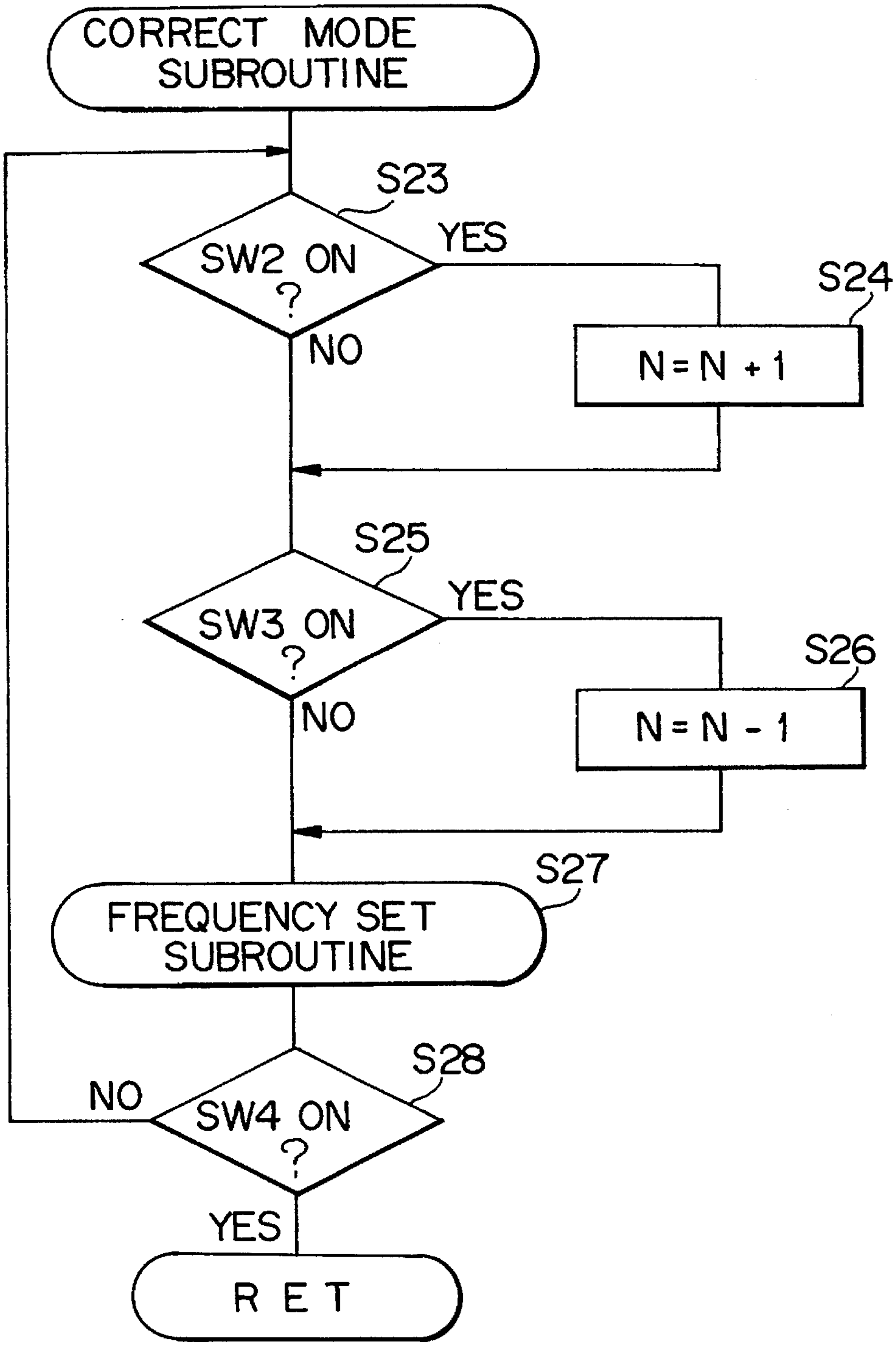

FIG. 4 shows a specific sequence of steps constituting the frequency set subroutine. As shown, the CPU 20 waits until the user presses the switch SW2 or SW1 (S11 and S12), while displaying "0" on the LCD 24 (S13). When the switch SW2 is pressed as determined in the step S11, the program returns to the main routine while holding "0" on the LCD 24. When the switch SW1 is pressed as determined in the step S12, the CPU 20 again waits until the user presses the switch SW2 or SW1 (steps S14 and S15), while displaying "1" on the LCD 24 (S16). When the switch SW2 is pressed as determined in the step S14, the operation returns to the main routine with "1" being held on the LCD 24. As the user presses the switch SW1 in the step S15, the program advances to steps S17 and S18. In the steps S17 and S18, the CPU 20 again waits until the user presses the switch SW2 or SW1, while displaying "2" on the LCD 24 (S19). When the user presses the switch SW2 in the step S17, the program returns to the main routine while continuously displaying "2" on the LCD 24. When the user presses the switch SW1 in the step S18, the program advances to steps S20 and S21. In the steps S20 and S21, the CPU 20 also waits until the user presses the switch SW2 or SW1 while displaying "-" on the LCD 24 (S22). When the user presses the switch SW2 in the step S20, the program returns to the main routine while holding "-" on the LCD 20. When the user presses the switch SW1 in the step S21, the program returns to the step S11.

As stated above, in the frequency set subroutine, whether or not the switch SW1 has been pressed is monitored. As the SW1 is pressed repetitively, the symbol appearing on the LCD 24 cyclically changes in the order of "0", "1", "2", and "-". Every time the switch SW2 is pressed, the program returns to the main routine, or tone pattern set mode, while maintaining the existing condition of the LCD 24. The symbols "0", "1", "2" and "-" represent respectively a monofrequency high-pitched tone, a monofrequency low-pitched tone, a bifrequency tone, and no tone, i.e. , silence. More specifically, a tone to appear at the N-th second is set and displayed on the LCD 24.

Figure 3:
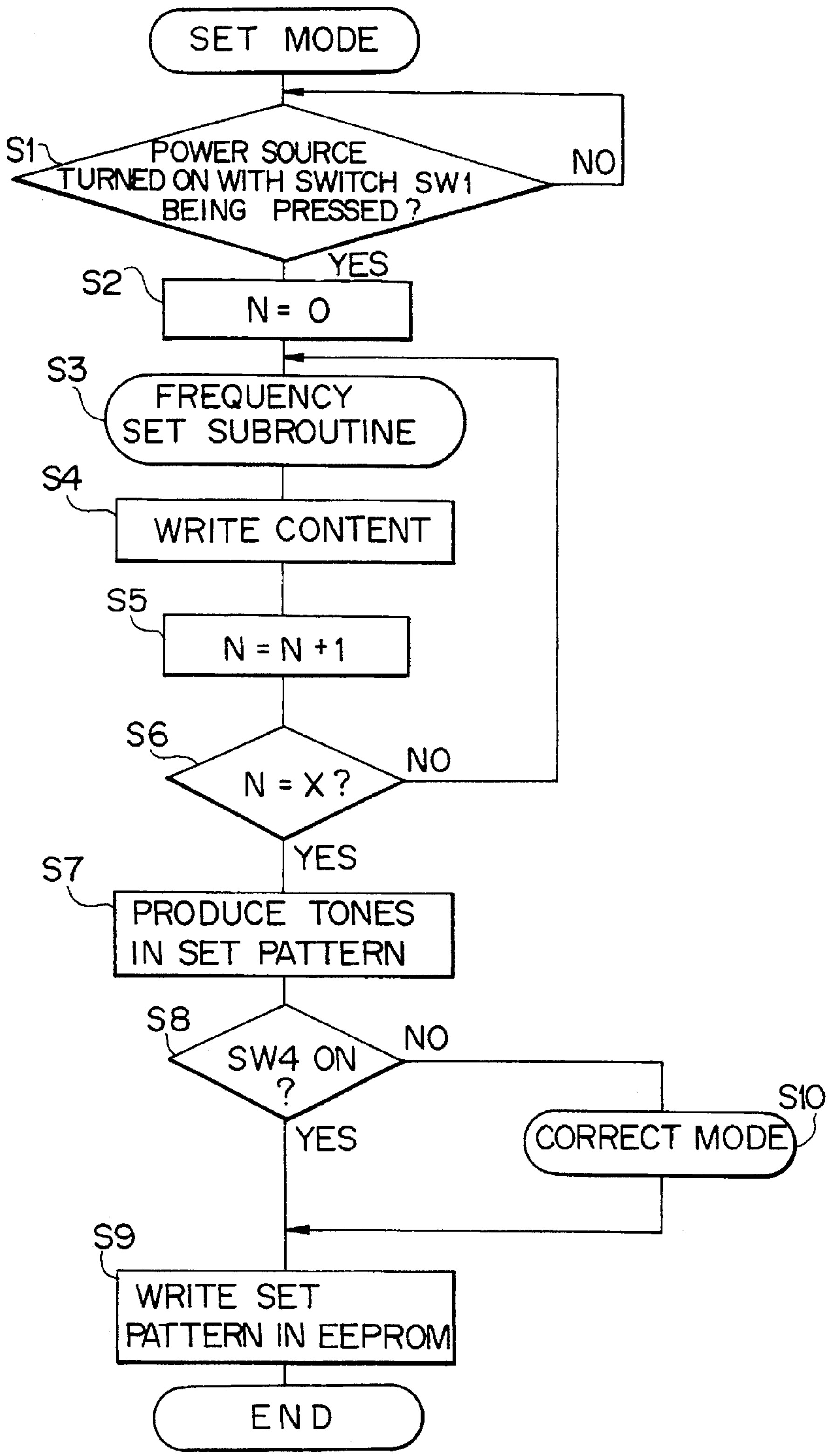
FIGS. 3, 4 and 5 are flowcharts demonstrating specific operations of the embodiment.

As the CPU 20 returns from the frequency set subroutine, FIG. 4, to the main routine, FIG. 3, in response to the operation of the switch SW2, it writes the content of the LCD 24 in the N-th address of a memory, not shown, which is built therein (S4). Then, the CPU 20 increments the counter N (S5) and determines whether or not the counter N has reached a predetermined count X (S6). The CPU 20 executes such an iterative loop S3–S6 to write the contents successively appearing on the LCD 24 in the addresses 1-X of the memory thereof. Assuming that the shortest interval between successive tones is 0.125 second and the tone period is 2.0 seconds, as shown in FIG. 1, then the count X is "16". In this manner, the different symbols "0", "1", "2" and "-" are combined to constitute a desired pattern consisting of sixteen successive tones and then written to the memory of the CPU 20. Subsequently, the CPU 20 delivers a sound signal representative of such a tone pattern to the driver 32 with the result that the tone pattern of interest is produced via the speaker 28 only once (S7). This allows the user to confirm the tone pattern having been set.

When the switch SW4 is in an OFF as determined in a step S8, the operation is transferred from the step S8 to a step S10, i.e., a correct mode. The correct mode allows the user who has heard the tone pattern to correct it if necessary. FIG. 5 shows a specific sequence of steps representative of the correct mode. As shown, when the switch SW2 is pressed (S23), the CPU 20 increments the counter N (S24). Conversely, when the switch SW3 is pressed (S25), the CPU 20 decrements the counter N (S26). After the counter N has been so set, the CPU 20 executes the frequency set subroutine, FIG. 4, (S27) for the correction of the tone pattern. Finally, as soon as the switch SW4 is pressed (S28), the program returns to a step S9 included in the main routine of FIG. 3. In the step S9, the CPU 20 transfers the tone pattern from the memory thereof to the EEPROM 22 and ends the set mode operation.

Once the user sets a particular tone pattern by operating the switches SW1–SW4, the tone pattern is stored in the EEPROM 22 and produced via the speaker 28 without being changed so long as it is not rewritten. Since the user is allowed to set any desired tone pattern in the paging receiver 10, it will be seldom that another paging receiver which may neighbor the paging receiver 10 produces tones in an identical pattern. The user of the paging receiver 10, therefore, can readily determine whether the receiver being called is the receiver 10 or whether it is another receiver.

In summary, it will be seen that the present invention provides a paging receiver with a display which allows the user of the receiver to set alert tones in any desired patterns and thereby facilitates the distinction of paging receivers of the same type.

Various modifications will become possible for those skilled in the art after receiving the teachings of the present disclosure without departing from the scope thereof. For example, the ID memory 18 and the memory for storing tone patterns, i.e., EEPROM 22 having been shown and described as implemented as indepenent memories may be constituted by a single memory.

What is claimed is:

1. A method of setting a desired tone pattern in a paging receiver, when a received paging signal is coincident with a paging signal assigned to said paging receiver comprising the following steps:

setting a desired tone pattern by turning on a power source of said paging receiver while simultaneously pressing any one of a plurality of switches provided on said paging receiver, each of said plurality of switches being manually operable to produce ON and OFF state signals;

setting a frequency of said desired tone pattern, further comprising the following steps:

displaying a first character on a LCD provided on said paging receiver until one of a first switch and a second switch of said plurality of switches is pressed, wherein when said second switch is pressed, writing a tone pattern associated with said first character into a storing means provided in said paging receiver while displaying said first character on said LCD, and when said first switch is pressed prior to pressing the second switch, displaying a second character on said LCD until one of said first or second switch is pressed;

when said second switch is pressed after the first switch has been pressed once, writing a tone pattern associated with said second character into said storing means while displaying said second character on said LCD, and when said first switch is pressed twice prior to pressing the second switch, displaying a third character on said LCD until said first or second switch is pressed;

when said second switch is pressed after the first switch has been pressed two times, writing a tone pattern associated with said third character into said storing means while displaying said third character on said LCD, and when said first switch is pressed three times before pressing the second switch, displaying a fourth character on said LCD until said first or second switch is pressed;

when said second switch is pressed after the first switch has been pressed three times, writing a tone pattern associated with said fourth character into said storing means while displaying said fourth character on said LCD;

when said first switch is pressed four times before pressing the second switch, setting a frequency of said desired tone pattern for a predetermined number of times; and using said tone patterns written into said storing means, and associated with at least one of said first through fourth characters, to form said desired tone pattern;

storing said desired tone pattern in said storage means after tone pattern is formed;

producing said desired tone pattern from said stored desired tone pattern; and displaying information corresponding to said desired tone pattern as said desired tone pattern is being produced.

2. A method of setting a desired tone pattern, in a paging receiver, when a received paging signal is coincident with a paging signal assigned to said paging receiver, comprising the following steps:

setting a desired tone pattern;

storing said desired tone pattern after tone pattern is formed;

producing said desired tone pattern from said stored desired tone pattern;

selectively changing said desired tone pattern; and displaying information associated with said desired tone pattern as said desired tone pattern is being produced in said tone pattern setting step;

wherein said tone pattern setting step comprises the following steps:

repeatedly pressing a first switch of a plurality of switches provided on said paging receiver to display on an LCD provided on said paging receiver, cyclically and in order, one of a plurality of symbols, each of said symbols corresponding to a different tone pattern;

pressing a second switch of said plurality of switches when desired to store the symbol displaying on said LCD into a storing means provided in said paging receiver;

counting a number of times that a symbol is stored into said storage means;

determining whether said number of times has reached a predetermined count; and combining said symbols corresponding to said different tone patterns stored into said storing means, to form said desired tone pattern.

3. A method of setting a desired tone pattern as in claim 2, wherein said plurality of symbols comprises "0", "1", "2" and "-" corresponding to a monofrequency high-pitched tone, a monofrequency low-pitched tone, a bifrequency tone, and no tone, respectively.

4. A method of setting a desired tone pattern as in claim 3, further comprising the following step to form a desired tone pattern comprising sixteen successive tones:

executing an iterative loop to write each of said symbols appearing on said LCD in an address of said storing means so that said symbols "0", "1", "2" and "-" are combined to thereby form said desired tone pattern comprising of sixteen successive tones.

5. A method of setting a desired tone pattern as in claim 2, further comprising the following step:

producing a sound signal representative of said desired tone pattern at the end of a said tone pattern setting step so as to allow confirmation of said desired tone pattern; and pressing a third switch of said plurality of switches to store said desired tone pattern in said storage means.

6. A method of setting a desired tone pattern as in claim 5, wherein said selectively changing step comprises the following steps:

selectively pressing said second switch to increment said predetermined count or pressing a fourth switch of said plurality of switches to decrement said predetermined count;

repeating said tone pattern setting step to obtain another desired tone pattern; and pressing said third switch of said plurality of switches to store said another desired tone pattern into said storing means.

* * * * *